US012155113B2

(12) United States Patent
Rofougaran et al.

(10) Patent No.: US 12,155,113 B2
(45) **Date of Patent: *Nov. 26, 2024**

(54) PHASED ARRAY ANTENNA PANEL HAVING REDUCED PASSIVE LOSS OF RECEIVED SIGNALS

(71) Applicant: Movandi Corporation, Irvine, CA (US)

(72) Inventors: Ahmadreza Rofougaran, Newport Beach, CA (US); Seunghwan Yoon, Irvine, CA (US); Alfred Grau Besoli, Irvine, CA (US); Farid Shirinfar, Granada Hills, CA (US); Sam Gharavi, Irvine, CA (US); Michael Boers, South Turramurra (AU); Maryam Rofougaran, Rancho Palos Verdes, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,002

(22) Filed: May 24, 2023

(65) Prior Publication Data

US 2023/0299463 A1 Sep. 21, 2023

Related U.S. Application Data

(63) Continuation of application No. 17/230,696, filed on Apr. 14, 2021, now Pat. No. 11,664,582, which is a (Continued)

(51) Int. Cl.

*H01Q 1/22* (2006.01)
*H01Q 1/52* (2006.01)

(Continued)

(52) U.S. Cl.

CPC ........... *H01Q 1/2283* (2013.01); *H01Q 1/523* (2013.01); *H01Q 21/065* (2013.01); *H01Q 21/24* (2013.01);

(Continued)

(58) Field of Classification Search

CPC .... H01Q 1/2283; H01Q 1/523; H01Q 21/065; H01Q 21/24; H01Q 3/26; H01Q 21/0006; H01Q 25/001

See application file for complete search history.

(56) References Cited

U.S. PATENT DOCUMENTS

| | | |
|---|---|---|
| 5,677,796 A | 10/1997 | Zimmerman et al. |
| 9,178,546 B1 | 11/2015 | Klemes |

(Continued)

OTHER PUBLICATIONS

Final Office Action for U.S. Appl. No. 17/903,092 dated Jun. 8, 2023.

(Continued)

*Primary Examiner* — David E Lotter
(74) *Attorney, Agent, or Firm* — Hopeton Walker

(57) ABSTRACT

A phased array antenna panel includes a first plurality of antennas, a first radio frequency (RF) front end chip, a second plurality of antennas, a second RF front end chip, and a combiner RF chip. The first and second RF front end chips receive respective first and second input signals from the first and second pluralities of antennas, and produce respective first and second output signals based on the respective first and second input signals. The combiner RF chip can receive the first and second output signals and produce a power combined output signal that is a combination of powers of the first and second output signals. Alternatively, a power combiner can receive the first and second output signals and produce a power combined output signal, and the combiner RF chip can receive the power combined output signal.

16 Claims, 8 Drawing Sheets

Related U.S. Application Data continuation of application No. 16/204,397, filed on Nov. 29, 2018, now Pat. No. 11,056,764, which is a continuation of application No. 15/356,172, filed on Nov. 18, 2016, now Pat. No. 10,199,717.

(51) Int. Cl.
*H01Q 21/06* (2006.01)
*H01Q 21/24* (2006.01)
*H01Q 3/26* (2006.01)
*H01Q 21/00* (2006.01)
*H01Q 25/00* (2006.01)

(52) U.S. Cl.
CPC .......... *H01Q 3/26* (2013.01); *H01Q 21/0006* (2013.01); *H01Q 25/001* (2013.01)

(56) References Cited

U.S. PATENT DOCUMENTS

| | | | |
|---|---|---|---|
| 9,252,908 B1 | 2/2016 | Branlund | |
| 10,854,995 B2 | 12/2020 | Rofougaran et al. | |
| 10,965,411 B2 | 3/2021 | Moshfeghi | |
| 11,075,724 B2 | 7/2021 | Moshfeghi | |
| 11,394,128 B2 | 7/2022 | Rofougaran et al. | |
| 11,637,664 B2 | 4/2023 | Moshfeghi | |
| 11,652,584 B2 | 5/2023 | Moshfeghi | |
| 11,715,890 B2 | 8/2023 | Rofougaran et al. | |
| 2009/0156227 A1 | 6/2009 | Frerking et al. | |
| 2009/0197538 A1 | 8/2009 | Borran et al. | |
| 2010/0097976 A1 | 4/2010 | Agrawal et al. | |
| 2011/0039496 A1 | 2/2011 | Chueh et al. | |
| 2011/0109507 A1 | 5/2011 | Warnick | |
| 2011/0256877 A1 | 10/2011 | Hoymann et al. | |
| 2012/0026998 A1 | 2/2012 | O'Keeffe et al. | |
| 2012/0149300 A1 | 6/2012 | Forster | |
| 2012/0320874 A1 | 12/2012 | Li et al. | |
| 2013/0341128 A1 | 12/2013 | Jordan et al. | |
| 2014/0104124 A1 | 4/2014 | Chernokalov et al. | |
| 2014/0210668 A1* | 7/2014 | Wang ...................... | H01Q 3/34 342/372 |
| 2016/0204513 A1 | 7/2016 | Yemelong et al. | |
| 2016/0359230 A1* | 12/2016 | Wang .................... | H01Q 21/22 |
| 2018/0191053 A1 | 7/2018 | Ndip et al. | |
| 2018/0231651 A1 | 8/2018 | Charvat | |
| 2018/0269576 A1 | 10/2018 | Scarborough et al. | |
| 2019/0020402 A1 | 1/2019 | Gharavi et al. | |
| 2022/0158717 A1 | 5/2022 | Frenger et al. | |

OTHER PUBLICATIONS

Non-Final Office Action for U.S. Appl. No. 17/887,672 dated Jul. 10, 2023.
Non-Final Office Action for U.S. Appl. No. 17/988,827 dated Jun. 22, 2023.
Non-Final Office Action for U.S. Appl. No. 18/083,756 dated Jun. 21, 2023.
Non-Final Office Action for U.S. Appl. No. 18/175,408 dated Jun. 16, 2023.
Notice of Allowance for U.S. Appl. No. 17/396,063 dated May 26, 2023.
Notice of Allowance for U.S. Appl. No. 17/898,706 dated Aug. 8, 2023.
Final Office Action for U.S. Appl. No. 17/903,130 dated Nov. 9, 2023.
Non-Final Office Action for U.S. Appl. No. 17/011,042 dated Sep. 15, 2023.
Non-Final Office Action for U.S. Appl. No. 17/903,092 dated Sep. 14, 2023.
Non-Final Office Action for U.S. Appl. No. 17/943,300 dated Sep. 27, 2023.
Notice of Allowance for U.S. Appl. No. 17/887,672 dated Oct. 17, 2023.
Notice of Allowance for U.S. Appl. No. 18/083,756 dated Nov. 14, 2023.
Final Office Action for U.S. Appl. No. 17/011,042 dated Jan. 5, 2024.
Final Office Action for U.S. Appl. No. 17/903,092 dated Mar. 29, 2024.
Non-Final Office Action for U.S. Appl. No. 18/175,408 dated Jan. 5, 2024.
Non-Final Office Action for U.S. Appl. No. 18/321,114 dated Feb. 1, 2024.
Non-Final Office Action for U.S. Appl. No. 18/321,160 dated Feb. 15, 2024.
Notice of Allowance for U.S. Appl. No. 17/943,300 dated Jan. 18, 2024.
Notice of Allowance for U.S. Appl. No. 17/903,130 dated Mar. 25, 2024.
Notice of Allowance for U.S. Appl. No. 17/988,827 dated Feb. 22, 2024.
Final Office Action for U.S. Appl. No. 18/175,408 dated Jun. 10, 2024.
Final Office Action for U.S. Appl. No. 18/321,160 dated May 30, 2024.
Non-Final Office Action for U.S. Appl. No. 17/011,042 dated Apr. 29, 2024.
Non-Final Office Action for U.S. Appl. No. 17/903,092 dated Jul. 5, 2024.
Non-Final Office Action for U.S. Appl. No. 18/321,114 dated May 17, 2024.
Non-Final Office Action for U.S. Appl. No. 18/326,222 dated Apr. 19, 2024.
Notice of Allowance for U.S. Appl. No. 17/903,130 dated Jul. 15, 2024.
Notice of Allowance for U.S. Appl. No. 18/326,222 dated Jul. 29, 2024.
Final Office Action for U.S. Appl. No. 17/011,042 dated Aug. 16, 2024.
Notice of Allowance for U.S. Appl. No. 18/321,114 dated Oct. 18, 2024.

* cited by examiner

190

PHASED ARRAY ANTENNA PANEL HAVING REDUCED PASSIVE LOSS OF RECEIVED SIGNALS

CROSS REFERENCE TO RELATED APPLICATIONS

This Patent Application is a Continuation Application of U.S. patent application Ser. No. 17/230,696, filed on Apr. 14, 2021, which is a Continuation application Ser. No. 16/204,397, filed on Nov. 29, 2018, which is a Continuation Application of U.S. patent Ser. No. 10/199,717, filed on Nov. 18, 2016. This application also makes reference to U.S. Pat. No. 9,923,712, filed on Aug. 1, 2016, titled "Wireless Receiver with Axial Ratio and Cross-Polarization Calibration," and U.S. patent application Ser. No. 15/225,523, filed on Aug. 1, 2016, titled "Wireless Receiver with Tracking Using Location, Heading, and Motion Sensors and Adaptive Power Detection," and U.S. patent application Ser. No. 15/226,785, filed on Aug. 2, 2016, titled "Large Scale Integration and Control of Antennas with Master Chip and Front End Chips on a Single Antenna Panel," and U.S. Pat. No. 10,014,567, filed on Sep. 2, 2016, titled "Novel Antenna Arrangements and Routing Configurations in Large Scale Integration of Antennas with Front End Chips in a Wireless Receiver," and U.S. Pat. No. 9,692,489 filed on Sep. 2, 2016, titled "Transceiver Using Novel Phased Array Antenna Panel for Concurrently Transmitting and Receiving Wireless Signals," and U.S. patent application Ser. No. 15/256,222 filed on Sep. 2, 2016, titled "Wireless Transceiver Having Receive Antennas and Transmit Antennas with Orthogonal Polarizations in a Phased Array Antenna Panel," and U.S. patent application Ser. No. 15/278,970 filed on Sep. 28, 2016, titled "Low-Cost and Low Loss Phased Array Antenna Panel," and U.S. patent application Ser. No. 15/279,171 filed on Sep. 28, 2016, titled "Phased Array Antenna Panel Having Cavities with RF Shields for Antenna Probes," and U.S. patent application Ser. No. 15/279,219 filed on Sep. 28, 2016, and titled "Phased Array Antenna Panel Having Quad Split Cavities Dedicated to Vertical-Polarization and Horizontal-Polarization Antenna Probes," and U.S. patent application Ser. No. 15/335,034 filed on Oct. 26, 2016, titled "Lens-Enhanced Phased Array Antenna Panel," and U.S. patent application Ser. No. 10/135,153 filed on Oct. 26, 2016, titled "Phased Array Antenna Panel with Configurable Slanted Antenna Rows," and U.S. patent application Ser. No. 15/355,967 filed on Nov. 18, 2016, titled "Phased Array Antenna Panel with Enhanced Isolation and Reduced Loss." Each of the aforementioned Patent Applications and Patents are hereby incorporated herein by reference in its entirety.

BACKGROUND

Phased array antenna panels with large numbers of antennas and front end chips integrated on a single board are being developed in view of higher wireless communication frequencies being used between a satellite transmitter and a wireless receiver, and also more recently in view of higher frequencies used in the evolving 5G wireless communications (5th generation mobile networks or 5th generation wireless systems). Phased array antenna panels are capable of beamforming by phase shifting and amplitude control techniques, and without physically changing direction or orientation of the phased array antenna panels, and without a need for mechanical parts to effect such changes in direction or orientation.

Phased array antenna panels use RF front end chips that directly interface with and collect RF signals from antennas situated adjacent to the RF front end chips. After processing the collected RF signals, the RF front end chips may provide the processed signals to a master chip that is situated relatively far from the RF front end chips. As such, relatively long transmission lines are required to carry the processed signals from the RF front end chips to the master chip. By their nature, transmission lines cause passive energy loss in the signals, especially when the transmission lines employed in the phased array antenna panel are long. Moreover, using a greater number or larger amplifiers in RF front end chips to transmit the processed signals to the master chip would increase the size, complexity, and cost of the numerous RF front end chips that are used in a phased array antenna panel. Thus, there is a need in the art for effective large-scale integration of a phased array antenna panel with reduced passive loss of signals.

SUMMARY

The present disclosure is directed to a phased array antenna panel having reduced passive loss of received signals, substantially as shown in and/or described in connection with at least one of the figures, and as set forth in the claims.

DETAILED DESCRIPTION

Figure 1A:
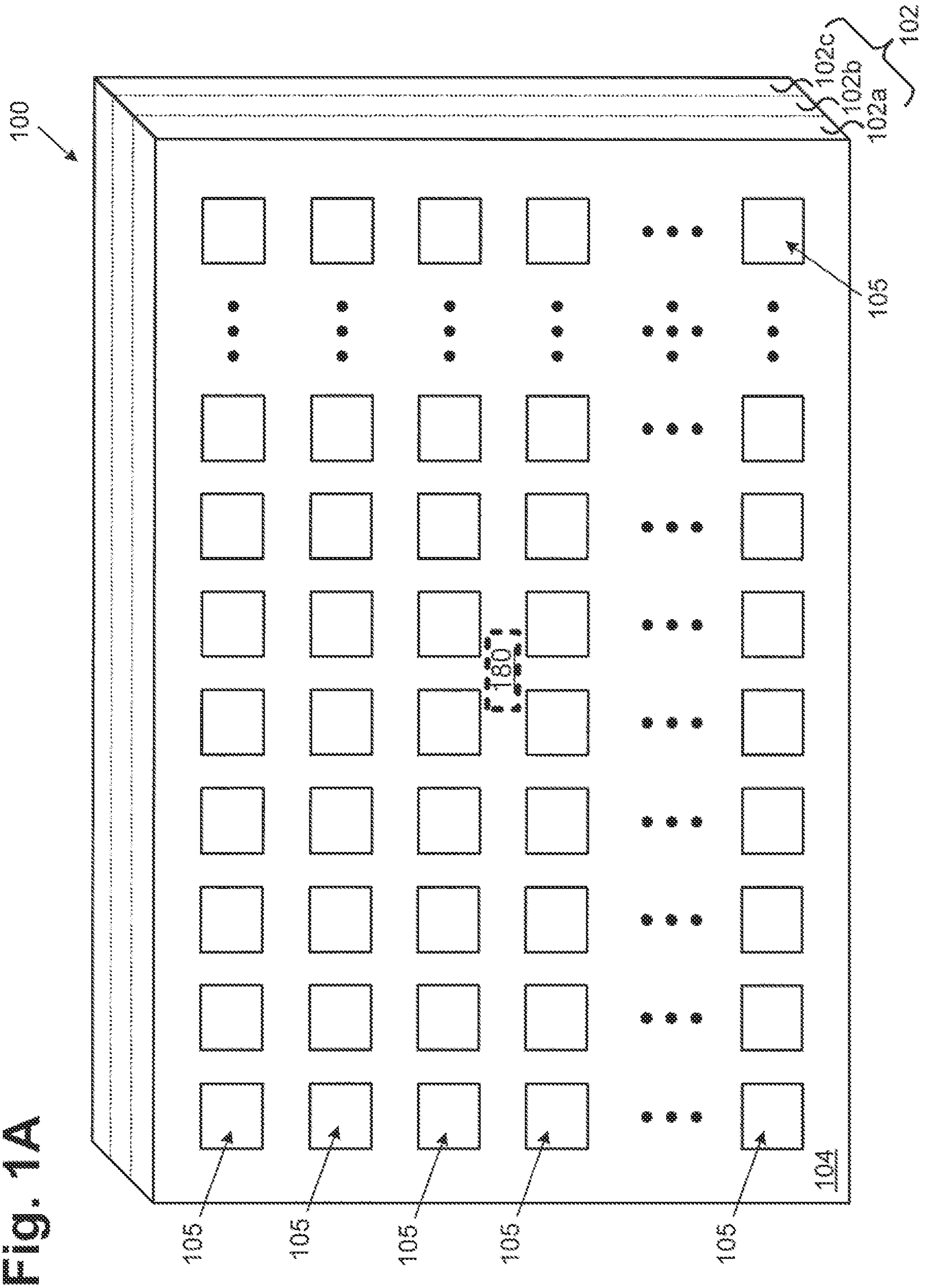
FIG. 1A illustrates a perspective view of a portion of an exemplary phased array antenna panel according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A illustrates a perspective view of a portion of an exemplary phased array antenna panel according to one implementation of the present application. As illustrated in FIG. 1A, phased array antenna panel 100 includes substrate 102 having layers 102*a*, 102*b*, and 102*c*, front surface 104 having front end units 105, and master chip 180. In the present implementation, substrate 102 may be a multi-layer printed circuit board (PCB) having layers 102*a*, 102*b*, and 102*c*. Although only three layers are shown in FIG. 1A, in another implementation, substrate 102 may be a multi-layer PCB having greater or fewer than three layers.

As illustrated in FIG. 1A, front surface 104 having front end units 105 is formed on top layer 102*a* of substrate 102. In one implementation, substrate 102 of phased array antenna panel 100 may include 500 front end units 105, each having a radio frequency (RF) front end chip connected to a plurality of antennas (not explicitly shown in FIG. 1A). In one implementation, phased array antenna panel 100 may include 2000 antennas on front surface 104, where each front end unit 105 includes four antennas connected to an RF front end chip (not explicitly shown in FIG. 1A).

In the present implementation, master chip 180 may be formed in layer 102*c* of substrate 102, where master chip 180 may be connected to front end units 105 on top layer 102*a* using a plurality of control and data buses (not explicitly shown in FIG. 1A) routed through various layers of substrate 102. In the present implementation, master chip 180 is configured to provide phase shift and amplitude control signals from a digital core in master chip 180 to the RF front end chips in each of front end units 105 based on signals received from the antennas in each of front end units 105.

Figure 1B:
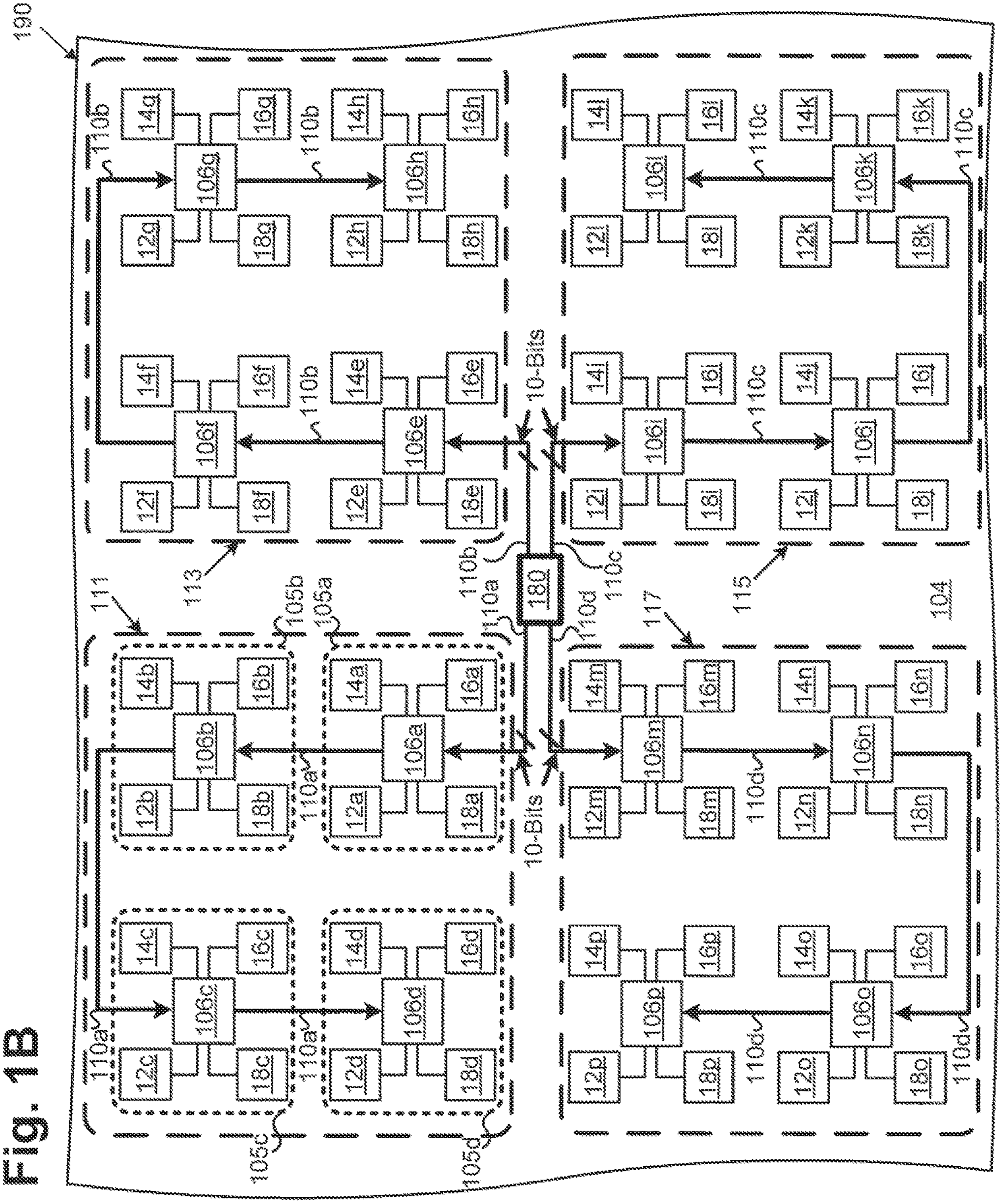
FIG. 1B illustrates a layout diagram of a portion of an exemplary phased array antenna panel according to one implementation of the present application.

FIG. 1B illustrates a layout diagram of a portion of an exemplary phased array antenna panel according to one implementation of the present application. For example, layout diagram 190 illustrates a layout of a simplified phased array antenna panel on a single printed circuit board (PCB), where master chip 180 is configured to drive in parallel four control and data buses, e.g., control and data buses 110*a*, 110*b*, 110*c*, and 110*d*, where each control and data bus is coupled to a respective antenna segment, e.g., antenna segments 111, 113, 115, and 117, where each antenna segment has four front end units, e.g., front end units 105*a*, 105*b*, 105*c*, and 105*d* in antenna segment 111, where each front end unit includes an RF front end chip, e.g., RF front end chip 106*a* in front end unit 105*a*, and where each RF front end chip is coupled to four antennas, e.g., antennas 12*a*, 14*a*, 16*a*, and 18*a* coupled to RF front end chip 106*a* in front end unit 105*a*.

As illustrated in FIG. 1B, front surface 104 includes antennas 12*a* through 12*p*, 14*a* through 14*p*, 16*a* through 16*p*, and 18*a* through 18*p*, collectively referred to as antennas 12-18. In one implementation, antennas 12-18 may be configured to receive and/or transmit signals from and/or to one or more commercial geostationary communication satellites or low earth orbit satellites.

In one implementation, for a wireless transmitter transmitting signals at 10 GHz (i.e., λ=30 mm), each antenna needs an area of at least a quarter wavelength (i.e., λ/4=7.5 mm) by a quarter wavelength (i.e., λ/4=7.5 mm) to receive the transmitted signals. As illustrated in FIG. 1B, antennas 12-18 in front surface 104 may each have a square shape having dimensions of 7.5 mm by 7.5 mm, for example. In one implementation, each adjacent pair of antennas 12-18 may be separated by a distance of a multiple integer of the quarter wavelength (i.e., n*λ/4), such as 7.5 mm, 15 mm, 22.5 mm and etc. In general, the performance of the phased array antenna panel improves with the number of antennas 12-18 on front surface 104.

In the present implementation, the phased array antenna panel is a flat panel array employing antennas 12-18, where antennas 12-18 are coupled to associated active circuits to form a beam for reception (or transmission). In one implementation, the beam is formed fully electronically by means of phase control devices associated with antennas 12-18. Thus, phased array antenna panel 100 can provide fully electronic beamforming without the use of mechanical parts.

As illustrated in FIG. 1B, RF front end chips 106*a* through 106*p*, and antennas 12*a* through 12*p*, 14*a* through 14*p*, 16*a* through 16*p*, and 18*a* through 18*p*, are divided into respective antenna segments 111, 113, 115, and 117. As further illustrated in FIG. 1B, antenna segment 111 includes front end unit 105*a* having RF front end chip 106*a* coupled to antennas 12*a*, 14*a*, 16*a*, and 18*a*, front end unit 105*b* having RF front end chip 106*b* coupled to antennas 12*b*, 14*b*, 16*b*, and 18*b*, front end unit 105*c* having RF front end chip 106*c* coupled to antennas 12*c*, 14*c*, 16*c*, and 18*c*, and front end unit 105*d* having RF front end chip 106*d* coupled to antennas 12*d*, 14*d*, 16*d*, and 18*d*. Antenna segment 113 includes similar front end units having RF front end chip 106*e* coupled to antennas 12*e*, 14*e*, 16*e*, and 18*e*, RF front end chip 106*f* coupled to antennas 12*f*, 14*f*, 16*f*, and 18*f*, RF front end chip 106*g* coupled to antennas 12*g*, 14*g*, 16*g*, and 18*g*, and RF front end chip 106*h* coupled to antennas 12*h*, 14*h*, 16*h*, and 18*h*. Antenna segment 115 also includes similar front end units having RF front end chip 106*i* coupled to antennas 12*i*, 14*i*, 16*i*, and 18*i*, RF front end chip 106*j* coupled to antennas 12*j*, 14*j*, 16*j*, and 18*j*, RF front end chip 106*k* coupled to antennas 12*k*, 14*k*, 16*k*, and 18*k*, and RF front end chip 106*l* coupled to antennas 12*l*, 14*l*, 16*l*, and 18*l*. Antenna segment 117 also includes similar front end units having RF front end chip 106*m* coupled to antennas 12*m*, 14*m*, 16*m*, and 18*m*, RF front end chip 106*n* coupled to antennas 12*n*, 14*n*, 16*n*, and 18*n*, RF front end chip 106*o* coupled to antennas 12*o*, 14*o*, 16*o*, and 18*o*, and RF front end chip 106*p* coupled to antennas 12*p*, 14*p*, 16*p*, and 18*p*.

As illustrated in FIG. 1B, master chip 108 is configured to drive in parallel control and data buses 110*a*, 110*b*, 110*c*, and 110*d* coupled to antenna segments 111, 113, 115, and 117, respectively. For example, control and data bus 110*a* is coupled to RF front end chips 106*a*, 106*b*, 106*c*, and 106*d* in antenna segment 111 to provide phase shift signals and amplitude control signals to the corresponding antennas coupled to each of RF front end chips 106*a*, 106*b*, 106*c*, and 106*d*. Control and data buses 110*b*, 110*c*, and 110*d* are configured to perform similar functions as control and data bus 110*a*. In the present implementation, master chip 180 and antenna segments 111, 113, 115, and 117 having RF front end chips 106*a* through 106*p* and antennas 12-18 are all integrated on a single printed circuit board.

It should be understood that layout diagram 190 in FIG. 1B is intended to show a simplified phased array antenna panel according to the present inventive concepts. In one implementation, master chip 180 may be configured to control a total of 2000 antennas disposed in ten antenna segments. In this implementation, master chip 180 may be configured to drive in parallel ten control and data buses, where each control and data bus is coupled to a respective antenna segment, where each antenna segment has a set of 50 RF front end chips and a group of 200 antennas are in each antenna segment; thus, each RF front end chip is coupled to four antennas. Even though this implementation describes each RF front end chip coupled to four antennas, this implementation is merely an example. An RF front end chip may be coupled to any number of antennas, particularly a number of antennas ranging from three to sixteen.

Figure 2:
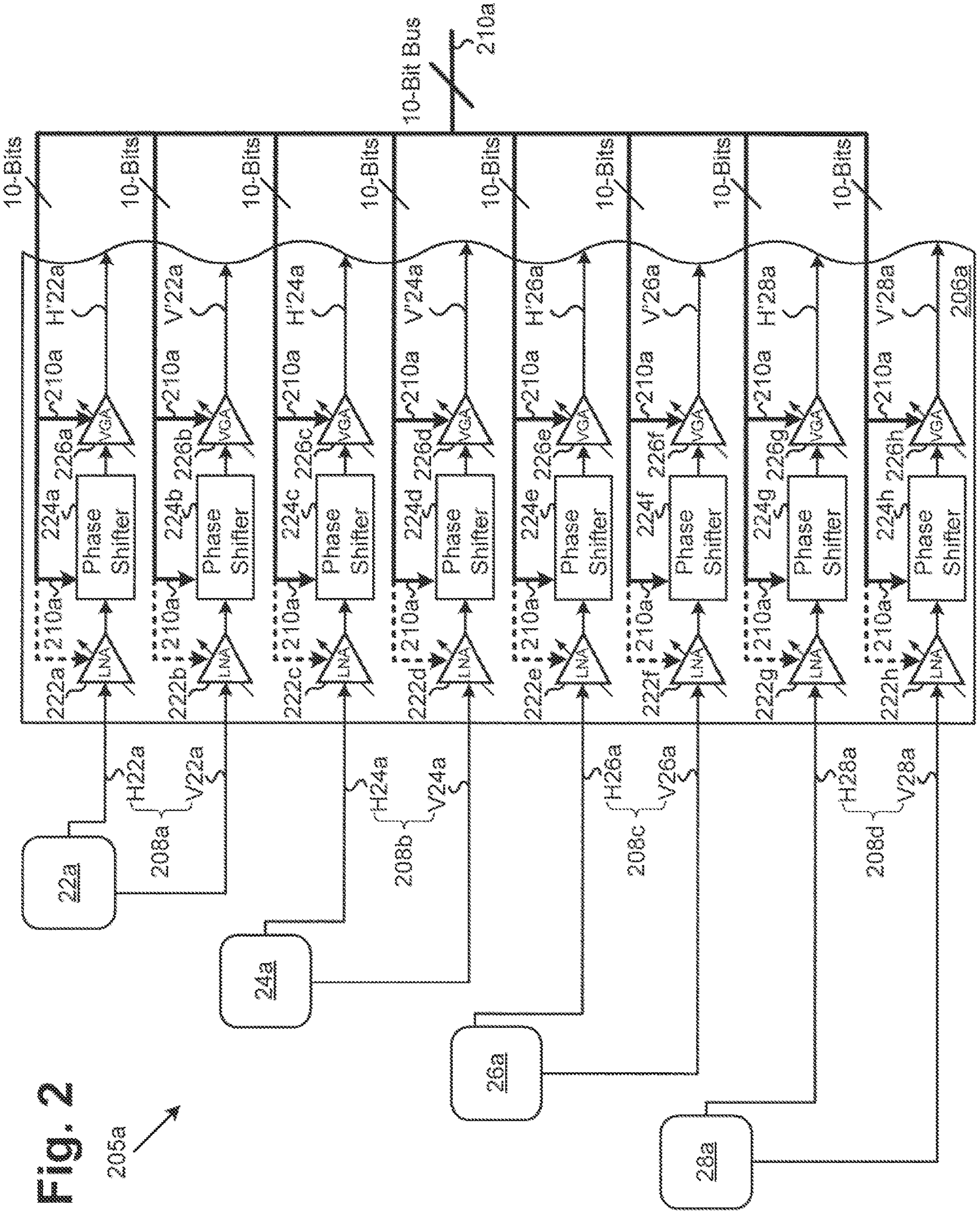
FIG. 2 illustrates a functional block diagram of a portion of an exemplary phased array antenna panel according to one implementation of the present application.

FIG. 2 illustrates a functional block diagram of a portion of an exemplary phased array antenna panel according to one implementation of the present application. In the present implementation, front end unit 205*a* may correspond to front end unit 105*a* in FIG. 1B of the present application. As illustrated in FIG. 2, front end unit 205*a* includes antennas 22*a*, 24*a*, 26*a*, and 28*a* coupled to RF front end chip 206*a*, where antennas 22*a*, 24*a*, 26*a*, and 28*a* and RF front end chip 206*a* may correspond to antennas 12*a*, 14*a*, 16*a*, and 18*a* and RF front end chip 106*a*, respectively, in FIG. 1B.

In the present implementation, antennas 22*a*, 24*a*, 26*a*, and 28*a* may be configured to receive signals from one or more commercial geostationary communication satellites, for example, which typically employ circularly polarized or linearly polarized signals defined at the satellite with a horizontally-polarized (H) signal having its electric-field oriented parallel with the equatorial plane and a vertically-polarized (V) signal having its electric-field oriented perpendicular to the equatorial plane. As illustrated in FIG. 2, each of antennas 22*a*, 24*a*, 26*a*, and 28*a* is configured to provide an H output and a V output to RF front end chip 206*a*.

For example, antenna 22*a* provides linearly polarized signal 208*a*, having horizontally-polarized signal H22*a* and vertically-polarized signal V22*a*, to RF front end chip 206*a*. Antenna 24*a* provides linearly polarized signal 208*b*, having horizontally-polarized signal H24*a* and vertically-polarized signal V24*a*, to RF front end chip 206*a*. Antenna 26*a* provides linearly polarized signal 208*c*, having horizontally-polarized signal H26*a* and vertically-polarized signal V26*a*, to RF front end chip 206*a*. Antenna 28*a* provides linearly polarized signal 208*d*, having horizontally-polarized signal H28*a* and vertically-polarized signal V28*a*, to RF front end chip 206*a*.

As illustrated in FIG. 2, horizontally-polarized signal H22*a* from antenna 22*a* is provided to a receiving chip having low noise amplifier (LNA) 222*a*, phase shifter 224*a* and variable gain amplifier (VGA) 226*a*, where LNA 222*a* is configured to generate an output to phase shifter 224*a*, and phase shifter 224*a* is configured to generate an output to VGA 226*a*. In addition, vertically-polarized signal V22*a* from antenna 22*a* is provided to a receiving chip including low noise amplifier (LNA) 222*b*, phase shifter 224*b* and variable gain amplifier (VGA) 226*b*, where LNA 222*b* is configured to generate an output to phase shifter 224*b*, and phase shifter 224*b* is configured to generate an output to VGA 226*b*.

As shown in FIG. 2, horizontally-polarized signal H24*a* from antenna 24*a* is provided to a receiving chip having low noise amplifier (LNA) 222*c*, phase shifter 224*c* and variable gain amplifier (VGA) 226*c*, where LNA 222*c* is configured to generate an output to phase shifter 224*c*, and phase shifter 224*c* is configured to generate an output to VGA 226*c*. In addition, vertically-polarized signal V24*a* from antenna 24*a* is provided to a receiving chip including low noise amplifier (LNA) 222*d*, phase shifter 224*d* and variable gain amplifier (VGA) 226*d*, where LNA 222*d* is configured to generate an output to phase shifter 224*d*, and phase shifter 224*d* is configured to generate an output to VGA 226*d*.

As illustrated in FIG. 2, horizontally-polarized signal H26*a* from antenna 26*a* is provided to a receiving chip having low noise amplifier (LNA) 222*e*, phase shifter 224*e* and variable gain amplifier (VGA) 226*e*, where LNA 222*e* is configured to generate an output to phase shifter 224*e*, and phase shifter 224*e* is configured to generate an output to VGA 226*e*. In addition, vertically-polarized signal V26*a* from antenna 26*a* is provided to a receiving chip including low noise amplifier (LNA) 222*f*, phase shifter 224*f* and variable gain amplifier (VGA) 226*f*, where LNA 222*f* is configured to generate an output to phase shifter 224*f*, and phase shifter 224*f* is configured to generate an output to VGA 226*f*.

As further shown in FIG. 2, horizontally-polarized signal H28*a* from antenna 28*a* is provided to a receiving chip having low noise amplifier (LNA) 222*g*, phase shifter 224*g* and variable gain amplifier (VGA) 226*g*, where LNA 222*g* is configured to generate an output to phase shifter 224*g*, and phase shifter 224*g* is configured to generate an output to VGA 226*g*. In addition, vertically-polarized signal V28*a* from antenna 28*a* is provided to a receiving chip including low noise amplifier (LNA) 222*h*, phase shifter 224*h* and variable gain amplifier (VGA) 226*h*, where LNA 222*h* is configured to generate an output to phase shifter 224*h*, and phase shifter 224*h* is configured to generate an output to VGA 226*h*.

As further illustrated in FIG. 2, control and data bus 210*a*, which may correspond to control and data bus 110*a* in FIG. 1B, is provided to RF front end chip 206*a*, where control and data bus 210*a* is configured to provide phase shift signals to phase shifters 224*a*, 224*b*, 224*c*, 224*d*, 224*e*, 224*f*, 224*g*, and 224*h* in RF front end chip 206*a* to cause a phase shift in at least one of these phase shifters, and to provide amplitude control signals to VGAs 226*a*, 226*b*, 226*c*, 226*d*, 226*e*, 226*f*, 226*g*, and 226*h*, and optionally to LNAs 222*a*, 222*b*, 222*c*, 222*d*, 222*e*, 222*f*, 222*g*, and 222*h* in RF front end chip 206*a* to cause an amplitude change in at least one of the linearly polarized signals received from antennas 22*a*, 24*a*, 26*a*, and 28*a*. It should be noted that control and data bus 210*a* is also provided to other front end units, such as front end units 105*b*, 105*c*, and 105*d* in segment 111 of FIG. 1B. In one implementation, at least one of the phase shift signals carried by control and data bus 210*a* is configured to cause a phase shift in at least one linearly polarized signal, e.g., horizontally-polarized signals H22*a* through H28*a* and vertically-polarized signals V22*a* through V28*a*, received from a corresponding antenna, e.g., antennas 22*a*, 24*a*, 26*a*, and 28*a*.

In one implementation, amplified and phase shifted horizontally-polarized signals H'22*a*, H'24*a*, H'26*a*, and H'28*a* in front end unit 205*a*, and other amplified and phase shifted horizontally-polarized signals from the other front end units, e.g. front end units 105*b*, 105*c*, and 105*d* as well as front end units in antenna segments 113, 115, and 117 shown in FIG. 1B, may be provided to a summation block (not explicitly shown in FIG. 2), that is configured to sum all of the powers of the amplified and phase shifted horizontally-polarized signals, and combine all of the phases of the amplified and phase shifted horizontally-polarized signals, to provide an H-combined output to a master chip such as master chip 180 in FIG. 1. Similarly, amplified and phase shifted vertically-polarized signals V'22*a*, V'24*a*, V'26*a*, and V'28*a* in front end unit 205*a*, and other amplified and phase shifted vertically-polarized signals from the other front end units, e.g. front end units 105*b*, 105*c*, and 105*d* as well as front end units in antenna segments 113, 115, and 117 shown in FIG. 1B, may be provided to a summation block (not explicitly shown in FIG. 2), that is configured to sum all of the powers of the amplified and phase shifted horizontally-polarized signals, and combine all of the phases of the amplified and phase shifted horizontally-polarized signals, to provide a V-combined output to a master chip such as master chip 180 in FIG. 1.

Figure 3A:
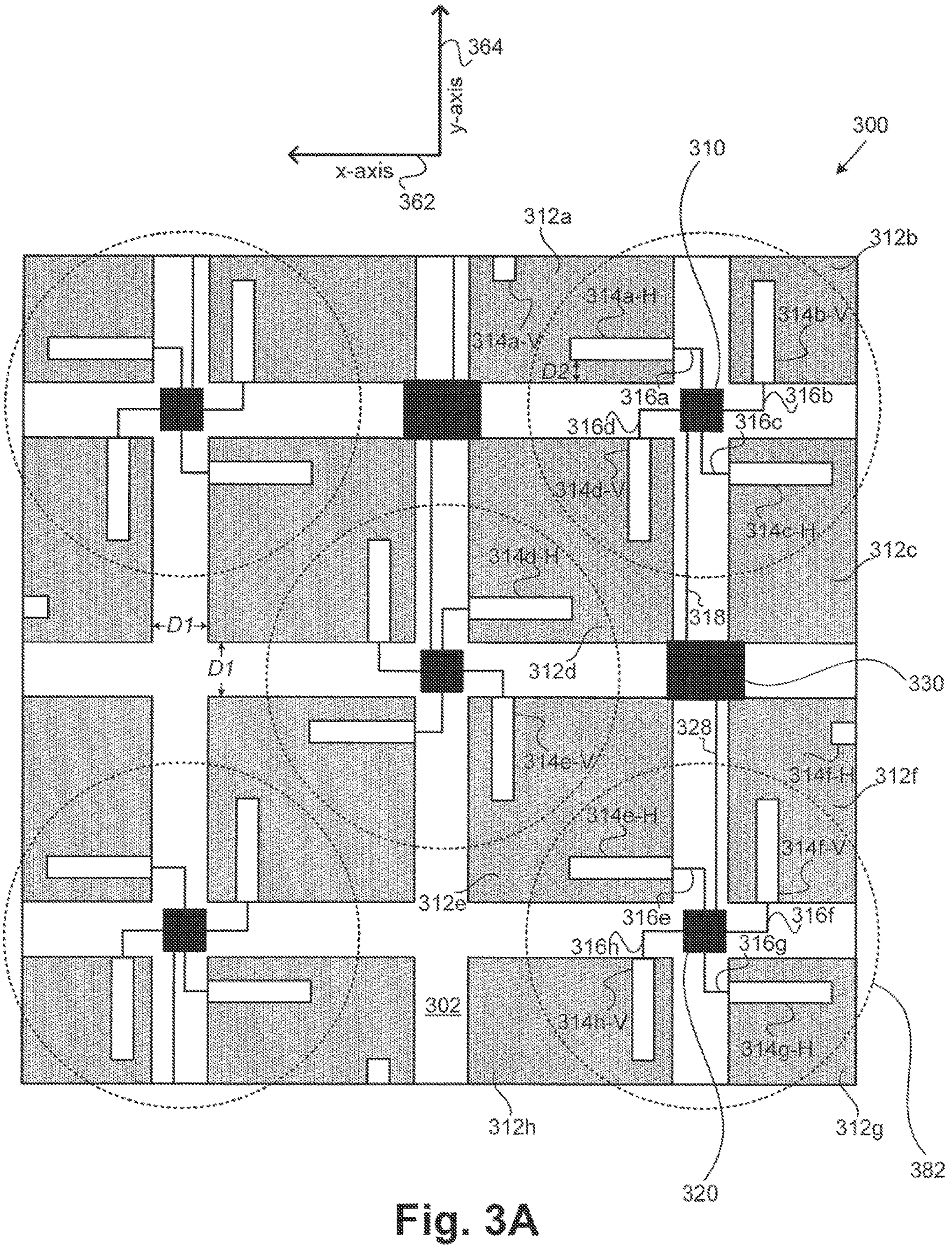
FIG. 3A illustrates a top view of a portion of an exemplary phased array antenna panel according to one implementation of the present application.

FIG. 3A illustrates a top view of a portion of an exemplary phased array antenna panel according to one implementation of the present application. As illustrated in FIG. 3A, exemplary phased array antenna panel 300 includes substrate 302, RF front end chips 310 and 320, antennas 312*a*, 312*b*, 312*c*, 312*d*, 312*e* 312*f*, 312*g*, and 312*h*, collectively referred to as antennas 312, probes 314*a*-V, 314*a*-H, 314*b*-V, 314*c*-H, 314*d*-V, 314*d*-H, 314*e*-V, 314*e*-H, 314*f*-V, 314*f*-H, 314*g*-H, and 314*h*-V, collectively referred to as probes 314, electrical connectors 316*a*, 316*b*, 316*c*, 316*d*, 316*e*, 316*f*, 316*g*, and 316*h*, collectively referred to as electrical connectors 316, signal lines 318 and 328, and combiner RF chip 330. Some features discussed in conjunction with the layout diagram of FIG. 1B, such as a master chip and control and data buses are omitted in FIG. 3A for the purposes of clarity.

As illustrated in FIG. 3A, antennas 312 are arranged on the top surface of substrate 302. In the present example, antennas 312 have substantially square shapes, or substantially rectangular shapes, and are aligned with each other. In this example, the distance between each antenna and an adjacent antenna is a fixed distance. As illustrated in the example of FIG. 3A, fixed distance D1 separates various adjacent antennas. In one implementation, distance D1 may be a quarter wavelength (i.e., λ/4). Antennas 312 may be, for example, cavity antennas or patch antennas or other types of antennas. The shape of antennas 312 may correspond to, for example, the shape of an opening in a cavity antenna or the shape of an antenna plate in a patch antenna. In other implementations, antennas 312 may have substantially circular shapes, or may have any other shapes. In some implementations, some of antennas 312 may be offset rather than aligned. In various implementations, distance D1 may be less than or greater than a quarter wavelength (i.e., less than or greater than λ/4), or the distance between each antenna and an adjacent antenna might not be a fixed distance.

As further illustrated in FIG. 3A, RF front end chips 310 and 320 are arranged on the top surface of substrate 302. RF front end chip 310 is adjacent to antennas 312*a*, 312*b*, 312*c*, and 312*d*. RF front end chip 320 is adjacent to antennas 312*e*, 312*f*, 312*g*, and 312*h*. Thus, each of RF front end chips 310 and 320 is adjacent to four antennas. RF front end chip 310 may be substantially centered or generally between antennas 312*a*, 312*b*, 312*c*, and 312*d*. Similarly, RF front end chip 320 may be substantially centered or generally between antennas 312*e*, 312*f*, 312*g*, and 312*h*. In other implementations, each of RF front end chips 310 and 320 may be between a number of adjacent antennas that is fewer than four or greater than four.

FIG. 3A illustrates probes 314 disposed in antennas 312. As illustrated in FIG. 3A, probes 314 may or may not be completely flush at the corners of antennas 312. For example, in antenna 312*a*, distance D2 may separate probe 314*a*-H the corner of antenna 312*a* adjacent to RF front end chip 310. Distance D2 may be, for example, a distance that allows tolerance during production or alignment of probes 314. In one example, the distance between RF front end chip 310 and probe 314*a*-H may be less than approximately 2 millimeters.

FIG. 3A further illustrates exemplary orientations of an x-axis (e.g., x-axis 362) and a perpendicular, or substantially perpendicular, y-axis (e.g., y-axis 364). Each of antennas 312 may have two probes, one probe parallel to x-axis 362 and the other probe parallel to y-axis 364. For example, antenna 312*d* has probe 314*d*-H parallel to x-axis 362, and probe 314*d*-V parallel to y-axis 364. Although the top view provided by FIG. 3A shows only one probe of antennas 312*b*, 312*c*, 312*g*, and 312*h*, the other probe of each of antennas 312*b*, 312*c*, 312*g*, and 312*h* may be disposed in a portion of the antenna that cannot be seen in the top view provided by FIG. 3A. Probes parallel to x-axis 362 may be configured to receive or transmit horizontally-polarized signals, as stated above. Probes parallel to y-axis 364 may be configured to receive or transmit vertically-polarized signals, as stated above. Thus, each of antennas 312 may have one horizontally-polarized probe and one vertically-polarized probe. In other implementations, each of antennas 312 may have any number of probes 314, and probes 314 may have any orientations and polarizations.

FIG. 3A further shows electrical connectors 316*a*, 316*b*, 316*c*, and 316*d*, coupling probes 314*a*-H, 314*b*-V, 314*c*-H, and 314*d*-V to RF front end chip 310, as well as electrical connectors 316*e*, 316*f*, 316*g*, and 316*h*, coupling probes 314*e*-H, 314*f*-V, 314*g*-H, and 314*h*-V to RF front end chip 320. In FIG. 3A, the dashed circles, such as dashed circle 382, surround each RF front end chip and its coupled probes. Electrical connectors 316 may be, for example, traces in substrate 302. Electrical connectors 316*a*, 316*b*, 316*c*, and 316*d* provide input signals to RF front end chip 310 from respective antennas 312*a*, 312*b*, 312*c*, and 312*d*. Electrical connectors 316*e*, 316*f*, 316*g*, and 316*h* provide input signals to RF front end chip 320 from respective antennas 312*e*, 312*f*, 312*g*, and 312*h*. Thus, each of RF front end chips 310 and 320 receives four input signals from four respective antennas. As stated above, RF front end chips 310 and 320 produce output signals based on these input signals. As stated above, a master chip (not shown in FIG. 3A) may provide phase shift and amplitude control signals to antennas 312 through RF front end chips 310 and 320. In other implementations, each of RF front end chips 310 and 320 may receive a number of input signals that is fewer than four or greater than four. In other implementations, each of RF front end chips 310 and 320 may receive more than one input signal from each of antennas 312.

FIG. 3A further illustrates signal lines 318 and 328 coupling respective RF front end chips 310 and 320 to combiner RF chip 330. Signal lines 318 and 328 may be, for example, traces in substrate 302. In this example, signal lines 318 and 328 each provide an output signal from respective RF front end chips 310 and 320 to combiner RF chip 330. In other implementations, each of RF front end chips 310 and 320 may produce more than one output signal, and more signal lines may be used. In this example, combiner RF chip 330 is arranged on the top surface of substrate 302, substantially centered between RF front end chips 310 and 320. In other implementations, the combiner RF chip may be arranged in substrate 302, or may not be substantially centered between RF front end chips 310 and 320.

Figure 3B:
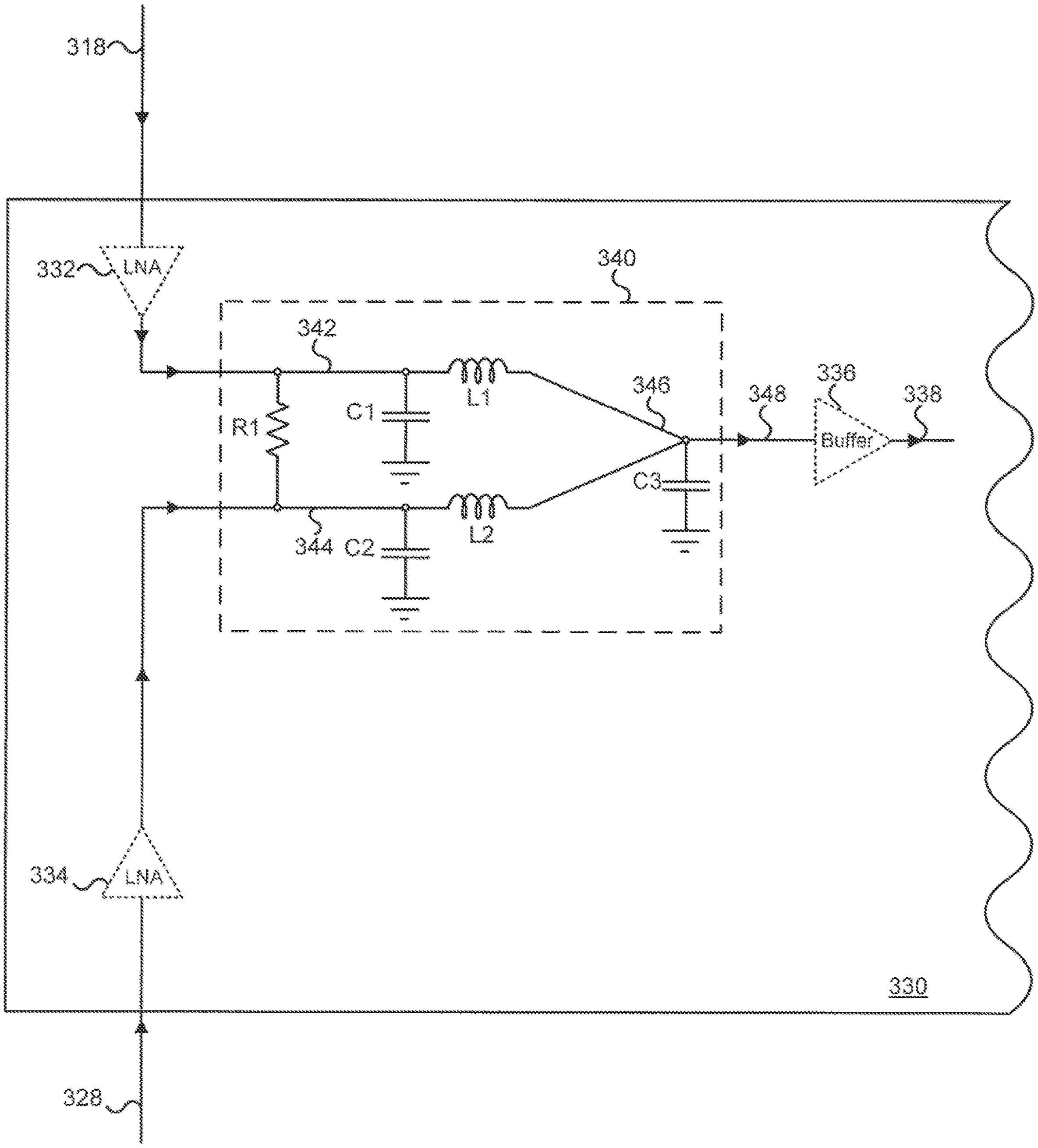
FIG. 3B illustrates an exemplary circuit diagram of a portion of an exemplary combiner RF chip according to one implementation of the present application.

FIG. 3B illustrates an exemplary circuit diagram of a portion of an exemplary combiner RF chip according to one implementation of the present application. As illustrated in FIG. 3B, exemplary combiner RF chip 330 receives signal lines 318 and 328, and includes optional input buffers 332 and 334, exemplary power combiner 340, power combined output line 348, optional output buffer 336, and buffered power combined output line 338. Combiner RF chip 330 in FIG. 3B corresponds to combiner RF chip 330 in FIG. 3A. Signal lines 318 and 328 in FIG. 3B correspond to respective signal lines 318 and 328 in FIG. 3A received from respective RF front end chips 310 and 320 in FIG. 3A. Signal lines 318 and 328 are fed into respective optional input buffers 332 and 334 on combiner RF chip 330. Input buffers 332 and 334 may be, for example, LNAs ("low noise amplifiers"). Input buffers 332 and 334 may provide gain and noise reduction to signals received from signal lines 318 and 328.

As illustrated in FIG. 3B, power combiner 340 is arranged on combiner RF chip 330. Power combiner 340 includes on-chip resistor R1, on-chip inductors L1 and L2, on-chip capacitors C1, C2, and C3, and nodes 342, 344, and 346. Signal lines 318 and 328 are fed into power combiner 340 at respective nodes 342 and 344. On-chip resistor R1 is coupled between nodes 342 and 344. On-chip inductor L1 is coupled between nodes 342 and 346. On-chip inductor L2 is coupled between nodes 344 and 346. On-chip capacitor C1 is coupled between node 342 and ground. On-chip capacitor C2 is coupled between node 344 and ground. On-chip capacitor C3 is coupled between node 346 and ground. Node 346 is coupled to power combined output line 348. The impedance, inductance and capacitance values for on-chip resistor R1, on-chip inductors L1 and L2, and on-chip capacitors C1, C2, and C3 may be chosen such that the impedance of each of signal lines 318 and 328, or the output impedance of optional buffers 332 and 334, in case such optional buffers are used, is matched to the impedance of power combined output line 348. In the present example, power combiner 340 is a lumped-element power combiner. In other implementations, power combiner 340 may be a microstrip power combiner, or any other power combiner.

As further illustrated in FIG. 3B, power combiner 340 on combiner RF chip 330 produces a power combined output signal at power combined output line 348. Power combined output signal at power combined output line 348 is a combination of powers of signals at signal lines 318 and 328. Signal lines 318 and 328 in FIG. 3B correspond to output signals of respective RF front end chips 310 and 320 in FIG. 3A, as stated above. Thus, the power combined output signal at power combined output line 348 is a combination of powers of output signals from RF front end chips 310 and 320. Power combined output line 348 may then be fed into other circuitry in combiner RF chip 330 or directly into transmission lines of phased array antenna panel 300. Because combiner RF chip 330 receives output signals of RF front end chips 310 and 320 and produces a power combined output signal that is a combination of powers of those output signals, a higher power signal can be fed into a transmission line driven by power combined output line 348, or if optional output buffer 336 is used, driven by buffered power combined output line 338. In addition, relatively short transmission lines (for signal lines 318 and 328) are used for each output signal of RF front end chips 310 and 320. Thus, phased array antenna panel 300 achieves reduced passive signal loss.

FIG. 3B also illustrates power combined output line from power combiner 340 fed into optional output buffer 336. Output buffer 336 may be, for example, a unity gain buffer, an amplifier, or an op-amp. Output buffer 336 may increase the resilience of power combiner 340, especially against subsequent loads in phased array antenna panel 300. Output buffer 336 in combiner RF chip 330 generates a buffered power combined output signal at buffered power combined output line 338 based on power combined output signal at power combined output line 348. Because combiner RF chip 330 receives output signals of RF front end chips 310 and 320 and can produce a buffered power combined output line 338 that is a combination of powers of those output signals, an output buffer is not required for each output signal of RF front end chips 310 and 320. Thus phased array antenna panel 300 achieves reduced number of active amplifier circuits.

Figure 4A:
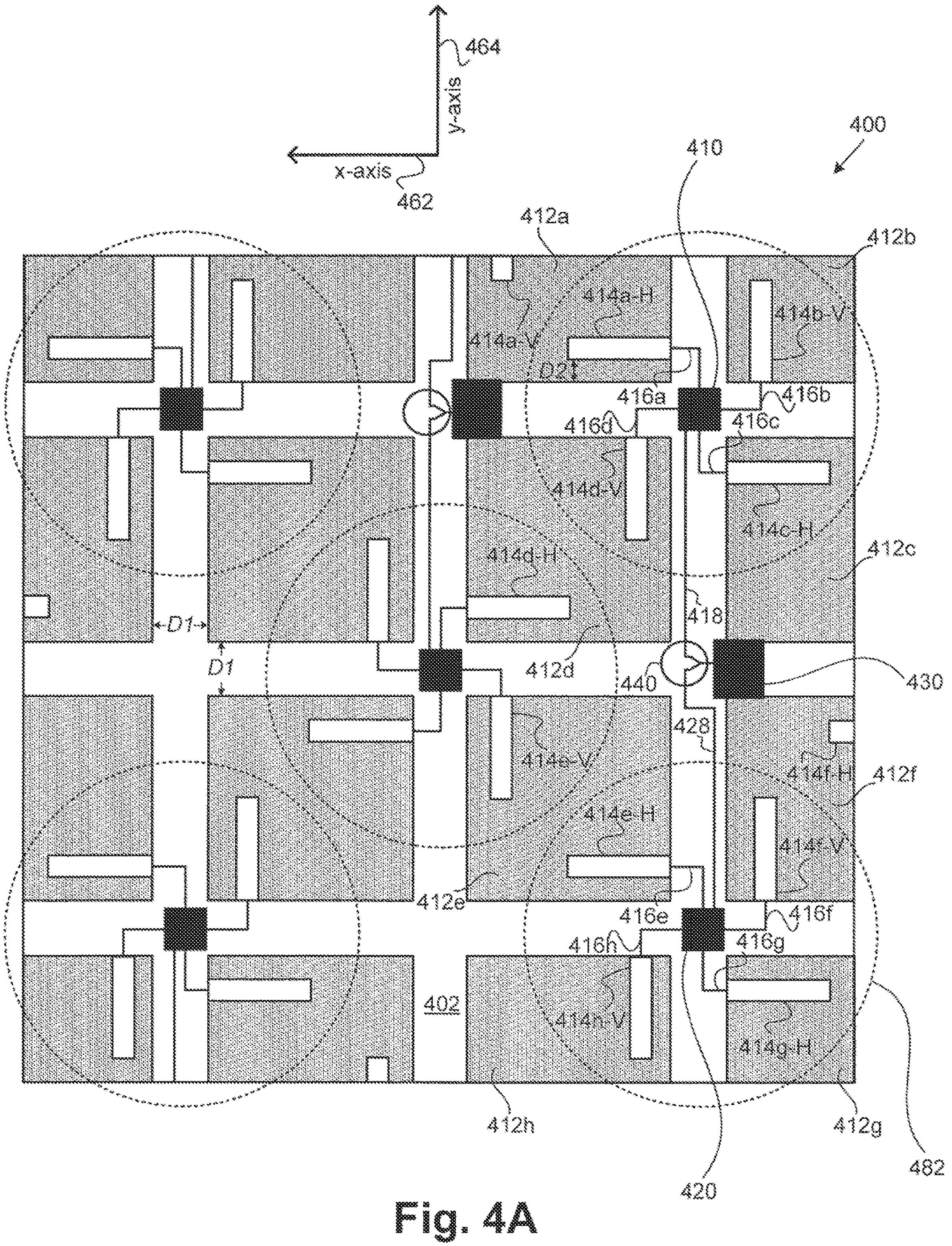
FIG. 4A illustrates a top view of a portion of an exemplary phased array antenna panel according to one implementation of the present application.

FIG. 4A illustrates a top view of a portion of an exemplary phased array antenna panel according to one implementation of the present application. As illustrated in FIG. 4A, exemplary phased array antenna panel 400 includes substrate 402, RF front end chips 410 and 420, antennas 412*a*, 412*b*, 412*c*, 412*d*, 412*e* 412*f*, 412*g*, and 412*h*, collectively referred to as antennas 412, probes 414*a*-V, 414*a*-H, 414*b*-V, 414*c*-H, 414*d*-V, 414*d*-H, 414*e*-V, 414*e*-H, 414*f*-V, 414*f*-H, 414*g*-H, and 414*h*-V, collectively referred to as probes 414, electrical connectors 416*a*, 416*b*, 416*c*, 416*d*, 416*e*, 416*f*, 416*g*, and 416*h*, collectively referred to as electrical connectors 416, signal lines 418 and 428, combiner RF chip 430, and power combiner 440. Some features discussed in conjunction with the layout diagram of FIG. 1B, such as a master chip and control and data buses are omitted in FIG. 4A for the purposes of clarity.

As illustrated in FIG. 4A, antennas 412 are arranged on the top surface of substrate 402. In the present example, antennas 412 have substantially square shapes, or substantially rectangular shapes, and are aligned with each other. In this example, the distance between each antenna and an adjacent antenna is a fixed distance. As illustrated in the example of FIG. 4A, fixed distance D1 separates various adjacent antennas. In one implementation, distance D1 may be a quarter wavelength (i.e., $\lambda/4$). Antennas 412 may be, for example, cavity antennas or patch antennas or other types of antennas. The shape of antennas 412 may correspond to, for example, the shape of an opening in a cavity antenna or the shape of an antenna plate in a patch antenna. In other implementations, antennas 412 may have substantially circular shapes, or may have any other shapes. In some implementations, some of antennas 412 may be offset rather than aligned. In various implementations, distance D1 may be less than or greater than a quarter wavelength (i.e., less than or greater than $\lambda/4$), or the distance between each antenna and an adjacent antenna might not be a fixed distance.

As further illustrated in FIG. 4A, RF front end chips 410 and 420 are arranged on the top surface of substrate 402. RF front end chip 410 is adjacent to antennas 412*a*, 412*b*, 412*c*, and 412*d*. RF front end chip 420 is adjacent to antennas 412*e*, 412*f*, 412*g*, and 412*h*. Thus, each of RF front end chips 410 and 420 is adjacent to four antennas. RF front end chip 410 may be substantially centered or generally between antennas 412*a*, 412*b*, 412*c*, and 412*d*. Similarly, RF front end chip 420 may be substantially centered or generally between antennas 412*e*, 412*f*, 412*g*, and 412*h*. In other implementations, each of RF front end chips 410 and 420 may be between a number of adjacent antennas that is fewer than four or greater than four.

FIG. 4A illustrates probes 414 disposed in antennas 412. As illustrated in FIG. 4A, probes 414 may or may not be completely flush at the corners of antennas 412. For example, in antenna 412*a*, distance D2 may separate probe 414*a*-H from the corner of antenna 412*a* adjacent to RF front end chip 410. Distance D2 may be, for example, a distance that allows tolerance during production or alignment of probes 414. In one example, the distance between RF front end chip 410 and probe 414*a*-H may be less than approximately 2 millimeters.

FIG. 4A further illustrates exemplary orientations of an x-axis (e.g., x-axis 462) and a perpendicular, or substantially perpendicular, y-axis (e.g., y-axis 464). Each of antennas 412 may have two probes, one probe parallel to x-axis 462 and the other probe parallel to y-axis 464. For example, antenna 412*d* has probe 414*d*-H parallel to x-axis 462, and probe 414*d*-V parallel to y-axis 464. Although the top view provided by FIG. 4A shows only one probe of antennas 412*b*, 412*c*, 412*g*, and 412*h*, the other probe of each of antennas 412*b*, 412*c*, 412*g*, and 412*h* may be disposed in a portion of the antenna that cannot be seen in the top view provided by FIG. 4A. Probes parallel to x-axis 462 may be configured to receive or transmit horizontally-polarized signals, as stated above. Probes parallel to y-axis 464 may be configured to receive or transmit vertically-polarized signals, as stated above. Thus, each of antennas 412 may have one horizontally-polarized probe and one vertically-polarized probe. In other implementations, each of antennas 412 may have any number of probes 414, and probes 414 may have any orientations and polarizations.

FIG. 4A further shows electrical connectors 416*a*, 416*b*, 416*c*, and 416*d*, coupling probes 414*a*-H, 414*b*-V, 414*c*-H, and 414*d*-V to RF front end chip 410, as well as electrical connectors 416*e*, 416*f*, 416*g*, and 416*h*, coupling probes 414*e*-H, 414*f*-V, 414*g*-H, and 414*h*-V to RF front end chip 420. In FIG. 4A, the dashed circles, such as dashed circle 482, surround each RF front end chip and its coupled probes. Electrical connectors 416 may be, for example, traces in substrate 402. Electrical connectors 416*a*, 416*b*, 416*c*, and 416*d* provide input signals to RF front end chip 410 from respective antennas 412*a*, 412*b*, 412*c*, and 412*d*. Electrical connectors 416*e*, 416*f*, 416*g*, and 416*h* provide input signals to RF front end chip 420 from respective antennas 412*e*, 412*f*, 412*g*, and 412*h*. Thus, each of RF front end chips 410 and 420 receives four input signals from four respective antennas. As stated above, RF front end chips 410 and 420 produce output signals based on these input signals. As stated above, a master chip (not shown in FIG. 4A) may provide phase shift and amplitude control signals to antennas 412 through RF front end chips 410 and 420. In other implementations, each of RF front end chips 410 and 420 may receive a number of input signals that is fewer than four or greater than four. In other implementations, each of RF front end chips 410 and 420 may receive more than one input signal from each of antennas 412.

FIG. 4A further illustrates signal lines 418 and 428 coupling respective RF front end chips 410 and 420 to power combiner 440. Signal lines 418 and 428 may be, for example, traces in substrate 402. In this example, signal lines 418 and 428 each provide an output signal from respective RF front end chips 410 and 420 to power combiner 440. In other implementations, each of RF front end chips 410 and 420 may produce more than one output signal, and more signal lines may be used. Power combiner 440 is coupled to combiner RF chip 430. Combiner RF chip 430 receives a power combined output signal from power combiner 440, as described below. In this example, power combiner 440 and combiner RF chip 430 are arranged on the top surface of substrate 402, substantially centered between RF front end chips 410 and 420. In other implementations, power combiner 440 and/or combiner RF chip 430 may be arranged in substrate 402, or may not be substantially centered between RF front end chips 410 and 420.

Figure 4B:
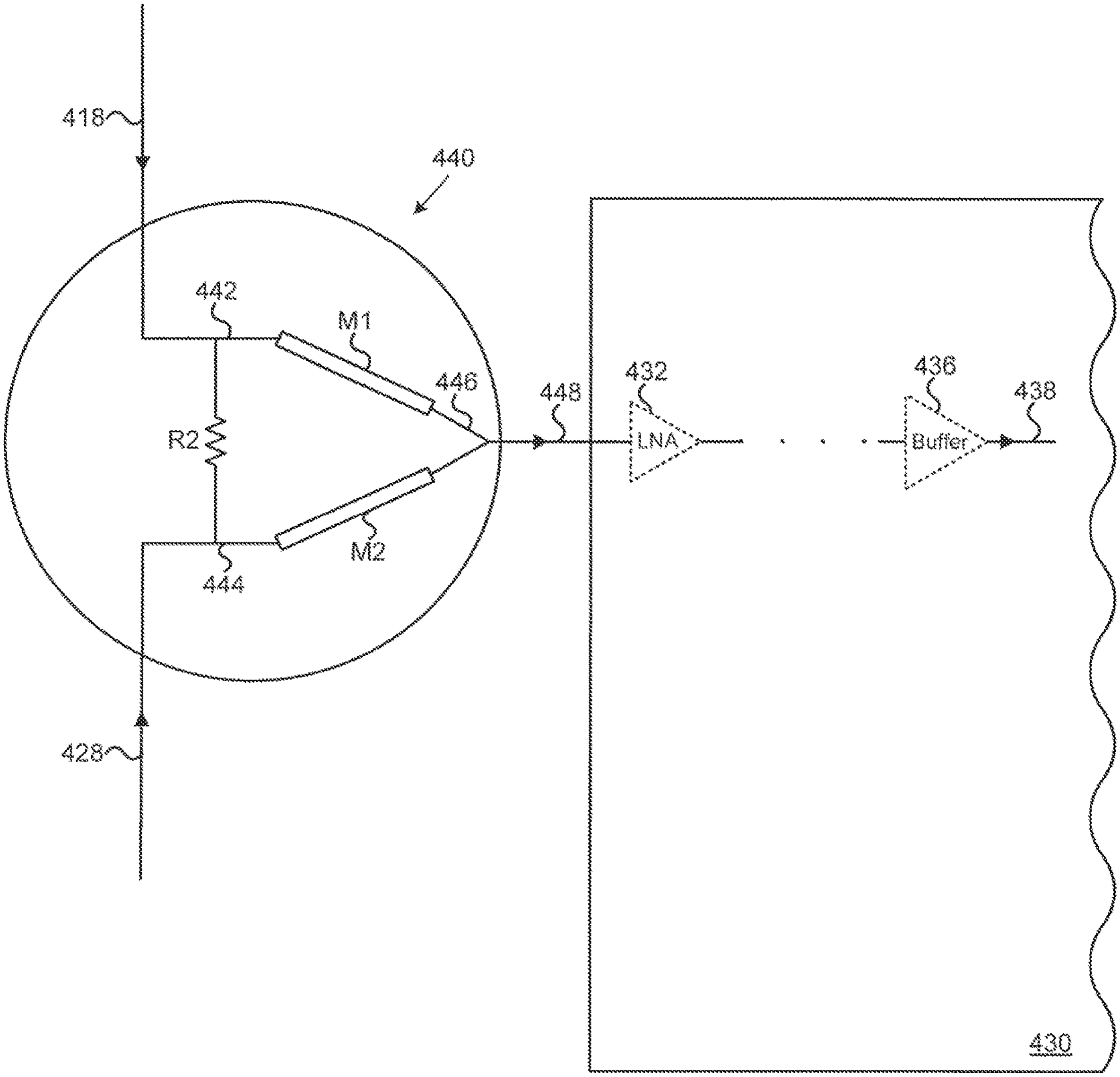
FIG. 4B illustrates an exemplary circuit diagram of a portion of an exemplary power combiner and a portion of an exemplary combiner RF chip according to one implementation of the present application.

FIG. 4B illustrates exemplary circuit diagrams of a portion of an exemplary power combiner and a portion of an exemplary combiner RF chip according to one implementation of the present application. As illustrated in FIG. 4B, exemplary power combiner 440 receives signal lines 418 and 428, and includes resistor R2, microstrips M1 and M2, nodes 442, 444, and 446, and power combined output line 448. Power combiner 440 in FIG. 4B corresponds to power combiner 440 in FIG. 4A. Signal lines 418 and 428 in FIG. 4B correspond to respective signal lines 418 and 428 in FIG. 4A, and receive output signals from respective RF front end chips 410 and 420 in FIG. 4A. Signal lines 418 and 428 are fed into power combiner 440 at respective nodes 442 and 444. Resistor R2 is coupled between nodes 442 and 444. Microstrip M1 is coupled between nodes 442 and 446. Microstrip M2 is coupled between nodes 444 and 446. Node 446 is coupled to power combined output line 448. Characteristic impedance values for resistor R2 and microstrips M1 and M2 may be chosen such that the impedance of each of signal lines 418 and 428 is matched to the impedance of power combined output line 448. For example, resistor R2 may have an impedance equal to twice the impedance of each of signal lines 418 and 428 (i.e., $2*Z_0$), and each of microstrips M1 and M2 may have a length equal to a quarter wavelength (i.e., $\lambda/4$) and an impedance equal to the impedance of each of signal lines 418 and 428 times the square root of two (i.e., $\sqrt{2}*Z_0$). In the present example, power combiner 440 is a microstrip power combiner. In other implementations, power combiner 440 may be a lumped-element power combiner, or any other power combiner.

As illustrated in FIG. 4B, power combiner 440 produces a power combined output signal at power combined output line 448. Power combined output signal at power combined output line 448 is a combination of powers of signals at signal lines 418 and 428. Signal lines 418 and 428 in FIG. 4B correspond to output signals of respective RF front end chips 410 and 420 in FIG. 4A, as stated above. Thus, the power combined output signal at power combined output line 448 is a combination of powers of output signals from RF front end chips 410 and 420. In other implementations, power combined output signal at power combined output line 448 may be a combination of powers of more than two output signals from any number of RF front end chips.

As further illustrated in FIG. 4B, exemplary combiner RF chip 430 receives power combined output line 448, and includes optional input buffer 432 and optional output buffer 436, and buffered power combined output line 438. Combiner RF chip 430 in FIG. 4B corresponds to combiner RF chip 430 in FIG. 4A. Combiner RF chip 430 receives a power combined output signal from power combiner 440 at power combined output line 448. Power combined output line 448 is fed into optional input buffer 432 on combiner RF chip 430. Input buffer 432 may be, for example, an LNA. Input buffer 432 may provide gain and noise reduction to signals received from power combined output line 448.

FIG. 4B also illustrates power combined output line 448 fed into optional output buffer 436. Output buffer 436 may be, for example, a unity gain buffer, an amplifier, or an op-amp. Output buffer 436 may increase the resilience of power combiner 440, especially against subsequent loads in phased array antenna panel 400. Output buffer 436 in combiner RF chip 430 generates a buffered power combined output signal at line 438 based on power combined output signal received from line 448. Power combined output line 448 may then be fed into transmission lines of phased array antenna panel 400. Because combiner RF chip 430 receives a power combined output signal that is a combination of powers of output signals of RF front end chips 410 and 420, a higher power signal can be fed into a transmission line driven by power combined output line 448. In addition, relatively short transmission lines (for signal lines 418 and 428) are used for each output signal of RF front end chips 410 and 420. Thus, phased array antenna panel 400 achieves reduced passive signal loss. Also, because combiner RF chip 430 receives output signals of RF front end chips 410 and 420 and can produce a buffered power combined output line 438 that is a combination of powers of those output signals, an output buffer is not required for each output signal of RF front end chips 410 and 420. Thus phased array antenna panel 400 achieves reduced number of active amplifier circuits.

Figure 5:
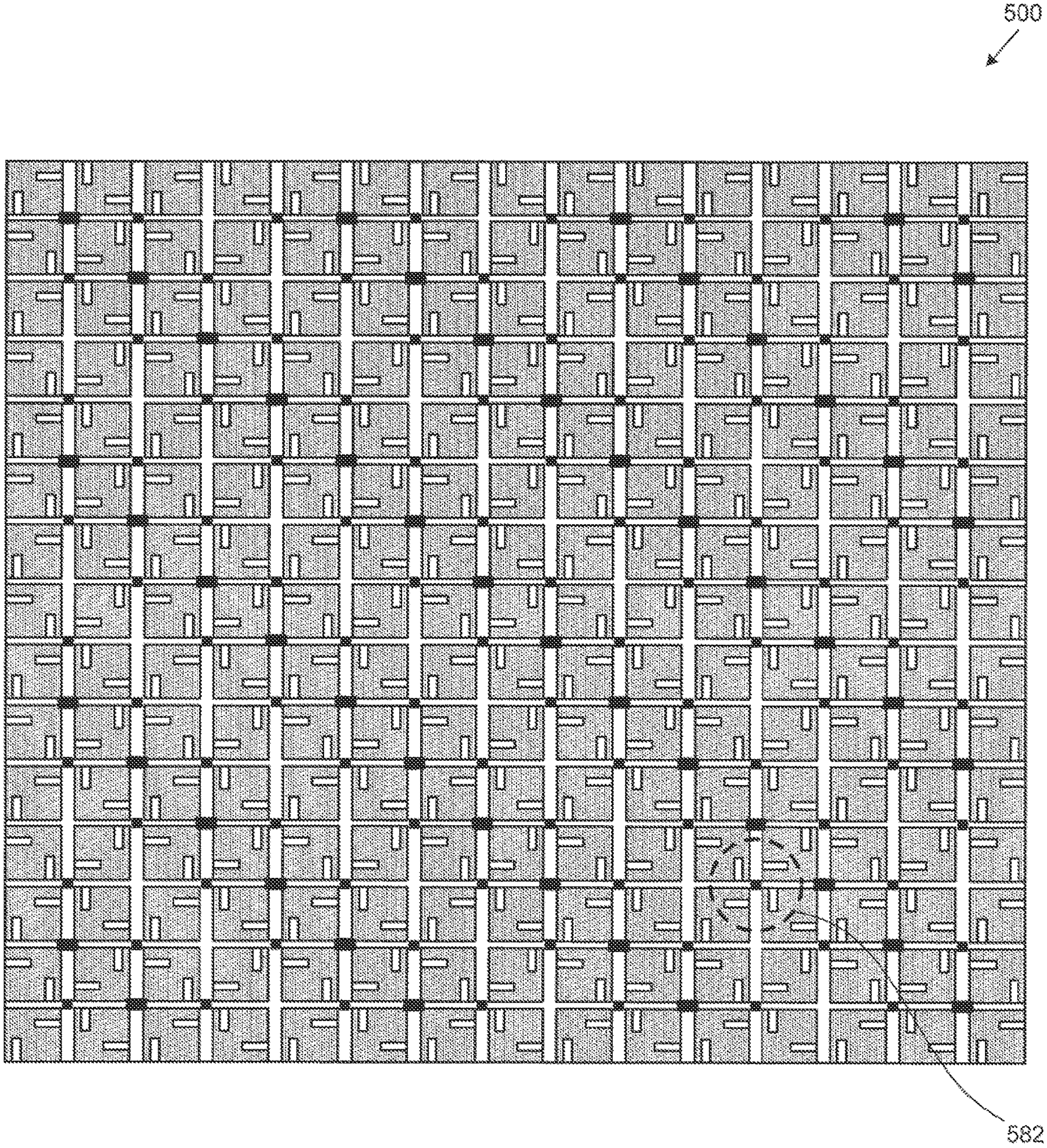
FIG. 5 illustrates a top view of a portion of an exemplary phased array antenna panel according to one implementation of the present application.

FIG. 5 illustrates a top view of a portion of an exemplary phased array antenna panel according to one implementation of the present application. FIG. 5 illustrates a large-scale implementation of the present application. Numerous antennas, RF front end chips, their corresponding probes, and combiner RF chips are arranged on phased array antenna panel 500. Dashed circle 582 in FIG. 5 may correspond to dashed circle 382 in FIG. 3A, which encloses probes 314*e*-H, 314*f*-V, 314*g*-H, and 314*h*-V, or may correspond to dashed circle 482 in FIG. 4A, which encloses probes 414*e*-H, 414*f*-V, 414*g*-H, and 414*h*-V. In one example, phased array antenna panel 500 may be a substantially square module having dimensions of eight inches by eight inches. In other implementations, phased array antenna panel module may have any other shape or dimensions. The various implementations and examples of RF front end chips, combiner RF chips, antennas, electrical connectors, probes, and distances in relation to any elements discussed in FIG. 3 or 4 may also apply to the large-scale implementation shown in phased array antenna panel 500 in FIG. 5.

Thus, various implementations of the present application result in reduced passive loss in the phased array antenna panel without increasing cost, size, and complexity of the phased array antennal panel. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A phased array antenna panel, comprising:
- a first radio frequency (RF) front end chip between a first plurality of antennas,
- wherein said first RF front end chip is configured to:
  - receive first input signals from said first plurality of antennas; and
  - produce a first phase-shifted output signal based on a first phase shift of said first input signals;
- a second RF front end chip between a second plurality of antennas,
- wherein said second RF front end chip is configured to:
  - receive second input signals from said second plurality of antennas; and
  - produce a second phase-shifted output signal based on a second phase shift of said second input signals; and
- a combiner RF chip comprising:
  - an input buffer configured to:
    - receive the first phase-shifted output signal from said first RF front end chip; and
    - receive the second phase-shifted output signal from said second RF front end chip;
  - a power combiner configured to combine the first phase-shifted output signal with the second phase-shifted output signal; and
  - an output buffer configured to generate a buffered power combined output signal from the first phase-shifted output signal and the second phase-shifted output signal.

2. The phased array antenna panel of claim 1, wherein said combiner RF chip comprises a lumped-element power combiner.

3. The phased array antenna panel of claim 2, wherein said lumped-element power combiner comprises at least one of an on-chip capacitor or an inductor.

4. The phased array antenna panel of claim 1, wherein said first phase-shifted output signal and said second phase-shifted output signal are fed into respective input buffers in said combiner RF chip.

5. The phased array antenna panel of claim 1, wherein said combiner RF chip is substantially centered between said first RF front end chip and said second RF front end chip.

6. The phased array antenna panel of claim 1, further comprising a master chip configured to:
- provide a first phase shift signal to said first plurality of antennas via said first RF front end chip; and
- provide a second phase shift signal to said second plurality of antennas via said second RF front end chip.

7. The phased array antenna panel of claim 1, further comprising a master chip configured to:
- drive in parallel a plurality of control and data buses coupled to said first plurality of antennas and said second plurality of antennas;
- provide a first amplitude control signal to said first plurality of antennas via said first RF front end chip; and
- provide a second amplitude control signal to said second plurality of antennas via said second RF front end chip.

8. The phased array antenna panel of claim 1, wherein said power combiner is a lumped-element power combiner.

9. The phased array antenna panel of claim 1, wherein said power combiner is a microstrip power combiner.

10. A phased array antenna panel, comprising:
- a master chip configured to drive a plurality of control and data buses coupled to a first plurality of antennas and a second plurality of antennas;
- a first radio frequency (RF) front end chip between said first plurality of antennas,
- wherein said first RF front end chip is configured to:
  - receive first input signals from said first plurality of antennas; and
  - produce a first phase-shifted output signal based on a first phase shift of said first input signals;
- a second RF front end chip between said second plurality of antennas,
- wherein said second RF front end chip is configured to:
  - receive second input signals from said second plurality of antennas; and
  - produce a second phase-shifted output signal based on a second phase shift of said second input signals;
- a power combiner on a substrate of said phased array antenna panel, wherein
  - said power combiner comprises input buffers coupled to the first phase-shifted output signal and the second phase-shifted output signal,
  - an impedance of the input buffers is matched to an impedance of a power combined output line, said input buffers are configured to receive said first phase-shifted output signal and said second phase-shifted output signal based on the impedance matching, and said power combiner is configured to output a power combined output signal, via the power combined output line, based on said first phase-shifted output signal and said second phase-shifted output signal; and a combiner RF chip configured to receive said power combined output signal via the power combined output line.

11. The phased array antenna panel of claim 10, wherein said combiner RF chip is further configured to produce a buffered power combined output signal based on said power combined output signal.

12. The phased array antenna panel of claim 10, wherein each antenna of said first plurality of antennas and said second plurality of antennas comprises vertically polarized probe and horizontally polarized probe.

13. The phased array antenna panel of claim 10, wherein said combiner RF chip is substantially centered between said first RF front end chip and said second RF front end chip.

14. The phased array antenna panel of claim 10, wherein said master chip is further configured to:

provide a first phase shift signal to said first plurality of antennas via said first RF front end chip; and provide a second phase shift signal to said second plurality of antennas via said second RF front end chip.

15. The phased array antenna panel of claim 10, wherein said master chip is further configured to:

provide a first amplitude control signal to said first plurality of antennas via said first RF front end chip; and provide a second amplitude control signal to said second plurality of antennas via said second RF front end chip.

16. A phased array antenna panel, comprising:

a master chip configured to drive a plurality of control and data buses coupled to a first plurality of antennas and a second plurality of antennas;

a first radio frequency (RF) front end chip between said first plurality of antennas, wherein said first RF front end chip is configured to:

receive first input signals from said first plurality of antennas, and produce a first amplified output signal based on a first amplification of said first input signals;

a second RF front end chip between said second plurality of antennas, wherein said second RF front end chip is configured to:

receive second input signals from said second plurality of antennas; and produce a second amplified output signal based on a second amplification of said second input signals;

a combiner RF chip comprises:

an input buffer configured to:

receive the first amplified output signal from said first RF front end chip; and receive the second amplified output signal from said second RF front end chip; and a power combiner configured to combine the first amplified output signal with the second amplified output signal; and an output buffer configured to generate a buffered power combined output signal from the first amplified output signal and the second amplified output signal.

* * * * *